United States Patent Office 3,476,490
Patented Nov. 4, 1969

3,476,490
METHODS OF USING PARTICULAR CARBAMIC ACID ESTERS FOR INSECTICIDAL AND ACARICIDAL PURPOSES
Christa Fest, Wuppertal-Elberfeld, and Ingeborg Hammann, Cologne, Germany, assignors to Farbenfabriken Bayer Aktiengesellschaft, Leverkusen, Germany, a corporation of Germany
No Drawing. Filed Mar. 2, 1966, Ser. No. 531,078
Claims priority, application Germany, Mar. 4, 1965, F 45,417
Int. Cl. A01n 9/20; C07c 125/06
U.S. Cl. 424—300                    12 Claims

ABSTRACT OF THE DISCLOSURE

Method of killing insects and/or acarids by applying to the corresponding insects, acarids and/or habitat thereof a correspondingly effective amount of an N-(unsubstituted, alkyl, and alkoxy- and/or halo-substituted alkyl)-N'-(alkyl, phenyl, and alkoxy-, halo-, nitro- and/or cyano-alkyl and -phenyl)-1-(1-fluoroacetamide-2,2,2-trichloro)-ethyl carbamate.

---

The present invention relates to new methods of using particular carbamic acid esters for insecticidal and/or acaricidal purposes, either alone or as active ingredients in admixture with dispersible carrier vehicles.

These particular carbamic acid esters have been described and claimed in copending U.S. application Ser. No. 499,068, filed Oct. 20, 1965, which states that such esters have strong selective rodenticidal properties.

It is also known that 1-isopropyl-3-methyl-5-pyrazolyl-dimethyl carbamate (A) and α-naphthyl-N-methyl carbamate (B) can be used as insecticidally active compounds. These last-mentioned two compounds have achieved considerable practical importance.

It is furthermore known that α-naphthyl-N-methyl-carbamate (B) can be used as an acaricidally active compound. This carbamate has considerable importance for this purpose as well.

It is an object of the present invention to provide new methods of using particular carbamic acid esters for arthropodicidal, i.e., insecticidal and/or acaricidal, purposes, either alone or as active ingredients in admixture with dispersible carrier vehicles.

Other and further objects of the present invention will become apparent from a study of the within specification and accompanying examples.

It has now been found, in accordance with the present invention, that the particular 1-(1-fluoroacetamido-2,2,2-trichloro)-ethyl carbamates having the general formula

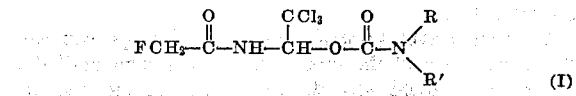

in which R represents a member selected from the group consisting of hydrogen, alkyl having 1–4 carbon atoms, and substituted alkyl having 1–4 carbon atoms which is substituted with a member selected from the group consisting of alkoxy having 1–4 carbon atoms, halo, and mixtures of such substituents, and R' represents a member selected from the group consisting of alkyl having 1–4 carbon atoms, phenyl, and the corresponding substituted alkyl and phenyl which are substituted with a member selected from the group consisting of alkoxy having 1–4 carbon atoms, halo, nitro, cyano, and mixtures of such substituents, have strong arthropodicidal, i.e., insecticidal and acaricidal, properties.

It is very surprising that the particular active compounds usable according to the present invention have a higher acaricidal and insecticidal activity than the carbamates hitherto known for the same purpose. The compositions according to the present invention thus constitute a valuable addition to the art.

The particular carbamic acid esters of general Formula I can be obtained by reacting in known manner:

(a) Chloral-fluoroacetamide of the formula

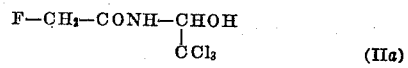  (IIa)

with an isocyanate of the general formula $$O=C=N-R'$$  (IIb)

in which R' is the same as defined above, or (b) Chloral-fluoroacetamide (IIa') with a carbamic acid chloride of the general formula

  (IIc)

in which R and R' are the same as defined above.

The reaction according to (a) can be carried out in inert solvents. Hydrocarbons, such as benzine and benzene, or chlorinated hydrocarbons, especially methylene chloride, can be used for this purpose, as well as ethers, such as dioxan. The reaction is accelerated by the addition of a tertiary amine, for example, triethylamine. The reaction temperatures may be varied within a fairly wide range. In general, the operation is carried out between 0 and 100° C.

The reaction according to (b) is expediently carried out in the presence of organic solvents, such as aromatic and aliphatic hydrocarbons, and especially ethers, such as dioxan, or ketones, such as acetone. The liberated hydrochloric acid is expediently bound by organic or inorganic acid binding agents. Tertiary amines, such as diethyl aniline and pyridine, and alkali metal hydroxides and alkali metal carbonates may be used for this purpose. The acid binding agents are added in equivalent amounts. The reaction temperatures may be varied within a fairly wide range. They are preferably between 0 and 50° C.

The compounds usable according to the present invention surprisingly have a strong insecticidal and acaricidal activity but only a low toxicity to warm-blooded animals and a low phytotoxicity. The effects appear rapidly and are long-lasting. The compounds can, therefore, be used advantageously with good results for combating noxious sucking and biting insects, Diptera and mites (Acarina).

Typical sucking insects contemplated herein essentially include aphids, such as the peach aphid (*Mycus persicae*), the black bean aphid (*Doralis fabae*), and the like; coccids, such as *Aspidiotus hederae*, *Lecanium*

*hesperdium* and *Pseudococcus maritimus,* and the like; Thysanoptera, such as *Hercinothrips femoralis,* and the like; and bugs, such as the beet-leaf bug (*Piesma quadrata*), and the bed bug (*Cimex lectularius*), and the like.

Also, typical biting insects contemplated herein essentially include butterfly larvae, such as *Plutella maculipennis* and *Lymantria dispar,* and the like; beetles, such as the grain weevil (*Sitophilus granarius*), the Colorado beetle (*Leptinotarsa decemlineata*), and also species living in the soil, such as wire worms (Agriotes sp.) and cockchafer larvae (*Melolontha melolontha*), and the like; cockroaches, such as the German cockroach (*Blatella germanica*), and the like; Orthoptera, such as the cricket (*Gryllus domesticus*), and the like; termites, such as Reticulitermes, and the like; and Hymenoptera, such as ants, and the like.

Typical Diptera contemplated herein essentially comprise the flies, such as the fruit fly (*Drosophila melanogaster*), the Mediterranean fruit fly (*Ceratitis capitata*), the house fly (*Musca domestica*), and gnats, such as mosquito (*Aedes aegypti*), and the like.

Among the typical mites contemplated herein, the spider mites (Tetranychidae) are of special importance, such as the common spider mite (*Tetranychus urticae*), the fruit tree spider mite (*Paratetranychus pilosus*), and the like; gall mites, such as the red currant gall mite (*Eriophyes ribis*) and tarsonemides, such as *Tarsonemus pallidus,* and ticks, and the like.

Thus, the particular compounds of the instant invention can be used as arthropodicides, i.e., insecticides and/or acaricides, either alone or in admixture with solid or liquid carriers or diluents.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with dispersible liquid diluent carriers and/or dispersible solid carriers optionally with the use of carrier vehicle assistants including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), amines (for instance, ethanolamine, etc.), amides (for instance, dimethyl formamide, etc.), ketones (for instance, acetone, etc.), and water; as well as dispersible finely divided solid carriers, such as natural ground minerals (for instance, kaolins, alumina, silica, chalk, i.e., calcium carbonate, talc, kieselguhr, etc.) and synthetic ground minerals (for instance, highly dispersed silicic acid, silicates, e.g., alkali silicates, etc.); whereas the following may be chiefly considered for use as carrier vehicle assistants for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0005 and 20%, preferably 0.1 and 5%, by weight of the mixture. Thus, the present invention contemplates over-all compositions which comprise mixtures of a dispersible carrier vehicle such as a dispersible carrier solid, or a dispersible carrier liquid preferably including a carrier vehicle assistant such as an emulsifying agent and/or a dispersing agent, and an amount of the active compound which is effective for the purpose in question and which is generally between about 0.0005 and 95% by weight of the mixture. Specifically, since the instant active compounds have also systemic properties, they need not be applied to agricultural crops by introduction into the vicinal soil of such crops for take-up by the particular plants, but instead may also be used aboveground by merely applying the same alone or in admixture with the carrier vehicle to the plant crops.

In particular, the present invention contemplates methods of selectively controlling or combating anthropods, i.e., insects and acarids, and more particularly, methods of combating at least one of insects and acarids which comprises applying to at least one of correspondingly (a) such insects, (b) such acarids, and (c) the corresponding habitat, a correspondingly combative amount, i.e., an arthropodically, especially insecticidally or acaricidally, effective amount, of the particular active compound of the invention alone or together with a carrier vehicle as noted above. The instant formulations or compositions are applied in the usual manner, for instance by spraying, atomizing, vaporizing, scattering, dusting, watering, sprinkling, and the like, whereby to apply the active compounds either to the plant parts themselves or to the vicinal soil itself, or both.

The following examples are given for the purpose of illustrating, while not limiting, the methods of use in accordance with the present invention:

EXAMPLE 1

Plutella test

Solvent: 3 parts by weight dimethyl formamide
Emulsifier: 1 part by weight alkylaryl polyglycol ether.

To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with the preparation of the given active compound until dew moist and infested with the caterpillars of the diamond back moth (*Plutella maculipennis*).

After the specified period of time, the degree of destruction is determined percentagewise. 100% indicates that all of the caterpillars are killed, whereas 0% indicates that none of them is killed.

The active compounds, their concentrations, the evaluation time and the results obtained can be seen from the following Table 1:

pound so that the preparation penetrates into the soil without wetting the leaves of the oat plants. The particu-

TABLE 1.—PLANT DAMAGING INSECTS

| Active Compound | Concentration of Active Compound in percent | Degree of Destruction in percent after 4 days |
|---|---|---|
| (A) 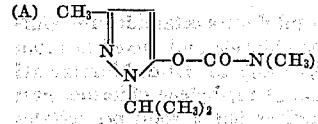 (Known) | 0.2<br>0.02 | 90<br>0 |
| (III) F—CH$_2$—CO—NH—CH(CCl$_3$)—O—CO—N(CH$_3$)$_2$ | 0.2<br>0.02<br>0.002<br>0.0002 | 100<br>100<br>90<br>0 |
| (IV) F—CH$_2$—CO—NH—CH(CCl$_3$)—O—CO—NH—CH$_3$ | 0.2<br>0.02<br>0.002 | 100<br>90<br>0 |
| (V) F—CH$_2$—CO—NH—CH(CCl$_3$)—O—CO—NH—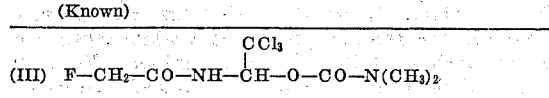—NO$_2$ | 0.2<br>0.02 | 100<br>30 |
| (VI) F—CH$_2$—CO—NH—CH(CCl$_3$)—O—CO—NH—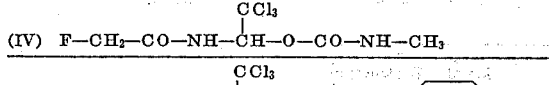 | 0.2<br>0.02 | 100<br>30 |

EXAMPLE 2

Rhopalosiphum test (systemic action)

Solvent: 3 parts by weight dimethyl formamide
Emulsifier: 1 part by weight alkylaryl polyglycol ether.

To produce a suitable preparation of the particular active compounds, 1 part by weight of such active compound is mixed with the stated amount of solvent containing the stated amount of emulsifier, and the resulting concentrate is diluted with water to the desired final concentration.

Oat plants (Avena sativa) which have been strongly infested with oat aphids (Rhopalosiphum padi) are watered with the preparation of the given active comlar active compound is taken up by the oat plants from the soil and thus reaches the infested leaves.

After the specified period of time, the degree of destruction is determined percentagewise. 100% indicates that all of the aphids are killed, whereas 0% indicates that none of them is killed.

The active compounds, their concentrations, the evaluation time and the results obtained can be seen from the following Table 2:

TABLE 2.—PLANT DAMAGING INSECTS

| Active Compound | Concentration of Active Compound in percent | Degree of Destruction in percent after 8 days |
|---|---|---|
| (B) 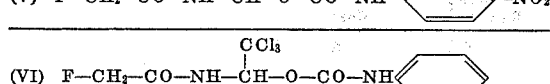—O—CO—NH—CH$_3$ (Known) | 0.02 | |
| (III') F—CH$_2$—CO—NH—CH(CCl$_3$)—O—CO—N(CH$_3$)$_2$ | 0.02<br>0.002<br>0.0002<br>0.00002 | 100<br>100<br>80<br>0 |
| (IV') F—CH$_2$—CO—NH—CH(CCl$_3$)—O—CO—NH—CH$_3$ | 0.02<br>0.002<br>0.0002 | 100<br>100<br>0 |
| (VII) F—CH$_2$—CO—NH—CH(CCl$_3$)—O—CO—NH—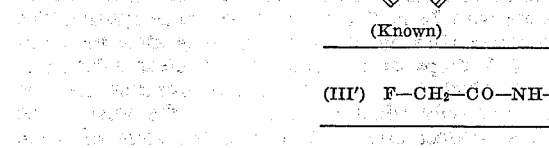—OC$_2$H$_5$ | 0.2<br>0.02<br>0.002 | 100<br>80<br>0 |
| (VIII) F—CH$_2$—CO—NH—CH(CCl$_3$)—O—CO—NH—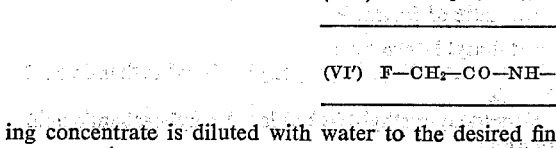 (with Cl, Cl substituents) | 0.2<br>0.02<br>0.002 | 100<br>80<br>0 |
| (VI') F—CH$_2$—CO—NH—CH(CCl$_3$)—O—CO—NH— | 0.2<br>0.02<br>0.002 | 100<br>60<br>0 |

EXAMPLE 3

Tetranychus test

Solvent: 3 parts by weight dimethyl formamide
Emulsifier: 1 part by weight alkylaryl polyglycol ether.

To produce a suitable preparation of the particular active compound, 1 part by weight of such active compound is mixed with the stated amount of solvent containing the stated amount of emulsifier, and the resulting concentrate is diluted with water to the desired final concentration.

Bush beans (*Phaseolus vulgaris*), which have a height of approximately 10–30 cm., are sprayed with the preparation of the given active compound until dripping wet. The bush beans are heavily infested with spider mites (*Tetranychus telarius*) in all stages of development.

After the specified period of time, the effectiveness of the preparation of the particular active compound is determined by counting the dead mites. The degree of destruction thus obtained is expressed percentagewise: 100% indicates that all of the spider mites are killed, whereas 0% indicates that none of them is killed.

The active compounds, their concentrations, the evaluation time and the results obtained can be seen from the following Table 3:

TABLE 3.—PLANT DAMAGING INSECTS

| Active Compound | | Concentration of Active Compound in percent | Degree of Destruction in percent after 8 days |
|---|---|---|---|
| (B) 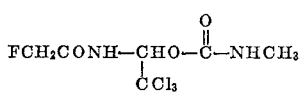 (Known) | | 0.2 | 0 |
| (III''') F—CH$_2$—CO—NH—CH(CCl$_3$)—O—CO—N(CH$_3$)$_2$ | | 0.2<br>0.02 | 100<br>0 |
| (IV''') F—CH$_2$—CO—NH—CH(CCl$_3$)—O—CO—NH—CH$_3$ | | 0.2<br>0.02 | 97<br>0 |
| (VI''') F—CH$_2$—CO—NH—CH(CCl$_3$)—O—CO—NH—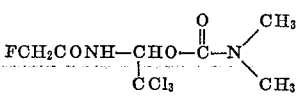 | | 0.2<br>0.02 | 100<br>70 |

The production of the particular carbamic acid esters usable according to the present invention is described in the following typical examples:

EXAMPLE 4

FCH$_2$CONH—CHO(CCl$_3$)—C(=O)—NHCH$_3$   (IV''')

112 grams (½ mol) of chloral-fluoroacetamide are slurried in 150 cc. of methylene chloride and mixed at room temperature with 30 g. of methyl isocyanate. The chloralfluoroacetamide dissolves after a few hours and the corresponding carbamic acid ester is precipitated after a few further hours. Another 30 g. of methyl isocyanate are added to complete the reaction. The precipitated product, i.e. 1-(1-fluoroacetamido-2,2,2-trichloro)ethyl-N-methyl carbamate, is filtered off with suction and recrystallized from methylene chloride. M.P. 133° C. Yield 52 g. (37% of theory).

EXAMPLE 5

FCH$_2$CONH—CHO(CCl$_3$)—C(=O)—N(CH$_3$)$_2$   (III''')

67 grams (³⁄₁₀ mol) of chloral-fluoroacetamide are dissolved in 200 cc. of ether. 24 grams (³⁄₁₀ mol) of pyridine are added and then 32 g. (³⁄₁₀ mol) of dimethyl-carbamic acid chloride are added dropwise at 15–20° C. The reaction mixture is stirred at room temperature for 12 hours and filtered off with suction from the precipitated pyridine hydrochloride. The solvent is removed in a vacuum. There remains an oil which slowly crystallizes. M.P. 105°

C. Yield 10 g. (11% of theory): 1-(1-fluoroacetamido-2,2,2-trichloro)ethyl-N,N-dimethyl carbamate.

EXAMPLE 6

FCH$_2$CONH—CHO(CCl$_3$)—C(=O)—NH—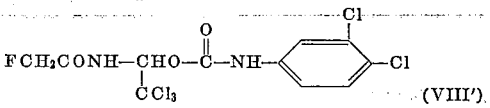   (VIII')

67 g. (³⁄₁₀ mol) of chloral-fluoroacetamide are slurried in 100 cc. of methylene chloride and mixed at room temperature with 57 g. (³⁄₁₀ mol) of 3,4-dichlorophenyl isocyanate dissolved in 50 cc. of methylene chloride. Part of the reaction product dissolves but it soon precipitates again. The mixture is stirred for 10 hours and then suction-filtered. The reaction product is a white crystalline compound melting at 260° C. (decomposition). Yield 40 g. (32% of theory): 1-(1-fluoroacetamido-2,2,2-trichloro)ethyl-N-(3',4'-dichlorophenyl)carbamate.

EXAMPLE 7

FCH$_2$CONH—CHO(CCl$_3$)—C(=O)—NHC$_6$H$_5$   (VI''')

44 g. (²⁄₁₀ mol) of chloral-fluoroacetamide are slurried in 100 cc. of methylene chloride and mixed at room temperature with 24 g. (²⁄₁₀ mol) of phenyl isocyanate. The temperature rises by about 10° C. only after the addition of 3 drops of triethylamine. A clear solution is formed, which is stirred at room temperature for one day. After only slight evaporation of the solvent, the reaction product crystallizes out in the form of white needles. M.P. 107–108° C. (recrystallized from cyclohexane). Yield 18 g. (27% of theory): 1-(1-fluoroacetamido-2,2,2-trichloro)-ethyl-N-phenyl carbamate.

Using corresponding molar amounts of chloral-fluoroacetamide and methylene chloride, and each of the following isocyanates, respectively, in accordance with the procedure of Example 4, and each of the following carbamic acid chlorides, respectively, in accordance with the procedure of Example 5:

(a) tert.-butyl-isocyanate;
(b) N-sec.-butyl-N-(4-isopropoxy)-n-butyl-carbamic acid chloride;
(c) N-methoxy-methyl-N-(2-chloro)-ethyl-carbamic acid chloride;
(d) N-(2-iso-butoxy)-ethyl-N-(3-nitro)-n-propyl-carbamic acid chloride;
(e) N-(2-chloro-2-fluoro)-n-propyl-N-(3-chloro-4-ethoxy-5-nitro)-phenyl-carbamic acid chloride;

(f) N-(2-bromo)-ethyl-N-(3-cyano)-n-propyl-carbamic acid chloride; and (g) N-(3-bromo-4-fluoro)-n-butyl-isocyanate, the corresponding 1 - (1-fluoroacetamido-2,2,2-trichloro)-ethyl-carbamates are produced:

(a′) 1-(1 - fluoroacetamido-2,2,2-trichloro)-ethyl-N-tert.-butyl-carbamate;
(b′) 1-(1-fluoroacetamido-2,2,2-trichloro)-ethyl-N-sec.-butyl-N-(4-iso-propoxy)-n-butyl-carbamate;
(c′) 1-(1-fluoroacetamido-2,2,2-trichloro)-ethyl-N-methoxy-methyl-N-(2-chloro-ethyl)-carbamate;
(d′) 1-(1-fluoroacetamido-2,2,2-trichloro)-ethyl-N-2-(iso-butoxy)-ethyl-N-(3-nitro-n-propyl)-carbamate;
(e′) 1-(1-fluoroacetamido-2,2,2-trichloro)-ethyl-N-(2-chloro-2-fluoro-n-propyl)-N-(3-chloro-4-ethoxy-5-nitro-phenyl)-carbamate;
(f′) 1-(1-fluoroacetamido-2,2,2-trichloro)-ethyl-N-2-bromo-ethyl-N-(3-cyano-propyl)-carbamate; and
(g′) 1-(1-fluoroacetamido-2,2,2-trichloro)-ethyl-N-(3-bromo-4-fluoro-n-butyl)-carbamate.

Advantageously, in accordance with the present invention, in the foregoing formulae:

R represents hydrogen; or alkyl having 1–4 carbon atoms, such as methyl, ethyl, n-propyl, isopropyl, n-butyl, iso-butyl, sec.-butyl, tert.-butyl, and the like, i.e., lower alkyl, which may be unsubstituted or mono-, di-, or poly-substituted with alkoxy having 1–4 carbon atoms, such as methoxy, ethoxy, n-propoxy, iso-propoxy, n-butoxy, iso-butoxy, sec.-butoxy, tert.-butoxy, and the like, i.e., lower alkoxy, and especially alkoxy having 1–2 carbon atoms, or halo, such as chloro, bromo, fluoro, and iodo, and especially chloro, fluoro and/or bromo as well as mixed alkoxy and halo substituents of the foregoing type; and R′ represents alkyl having 1–4 carbon atoms, such as the radicals mentioned in the immediately preceding paragraph for R; or phenyl, which alkyl or phenyl may be unsubstituted or mono-, di- or poly-substituted with alkoxy having 1–4 carbon atoms, such as the radicals mentioned in the immediately preceding paragraph for the alkoxy substituents, especially alkoxy having 1–2 carbon atoms, i.e., methoxy or ethoxy, or halo, such as chloro, bromo, fluoro, and iodo, and especially chloro, fluoro and/or bromo, or nitro, or cyano, as well as mixed alkoxy, halo, nitro and cyano substituents of the aforementioned type.

In particular, preferred esters coming within the purview of the present invention include 1-(1-fluoroacetamido - 2,2,2 - trichloro) - ethyl - N - ($C_1$–$C_4$ alkyl)-carbamate having the formula

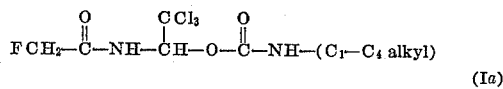

(Ia)

1 - (1 - fluoro - acetamido - 2,2,2 - trichloro) - ethyl - N, N-di($C_1$–$C_4$ alkyl)-carbamate having the formula:

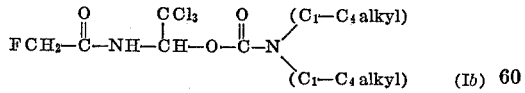

(Ib)

and 1 - (1 - fluoroacetamido - 2,2,2 - trichloro) - ethyl-N-phenyl-carbamate having the formula:

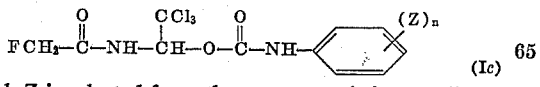

(Ic)

in which Z is selected from the group consisting of alkoxy having 1–4 carbon atoms, chloro, and nitro, and $n$ is a number from 0 to 2.

It will be realized by the artisan that all of the foregoing ester compounds contemplated by the present invention possess the desired selective arthropodicidal, i.e., insecticidal or acaricidal, properties for combating insects and acarids, and that such compounds have not only a very slight toxicity toward warm-blooded creatures, except selectively rodents, such as short-tailed mice, as may be seen from the aforesaid copending U.S. application Ser. No. 499,068, but also a low phytotoxicity.

It will be appreciated that as used herein, i.e., both in the specification and claims, the terms "arthropod," "arthropodicidal" and "arthropodicide" are defined as including specifically both insects and acarids within the contemplation of their meaning, for convenience in determining the collective aspects of utility herein. Thus, the insects and acarids may be considered herein collectively as arthropods to be combated collectively in accordance with the invention, and accordingly the insecticidal and/or acaricidal activity may be termed arthropodicidal activity, and the concomitant combative or effective amount used in accordance with the invention will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Method of killing insects and acarids which comprises applying to at least one of (a) such insects, (b) such acarids, and (c) the corresponding habitat thereof, an effective amount of a 1-(1-fluoroacetamido-2,2,2-trichloro)ethyl carbamate having the formula

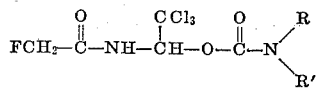

in which R represents a member selected from the group consisting of hydrogen, alkyl having 1–4 carbon atoms, and substituted alkyl having 1–4 carbon atoms which is substituted with a member selected from the group consisting of alkoxy having 1–4 carbon atoms, halo, and mixtures of such substituents, and R′ represents a member selected from the group consisting of alkyl having 1–4 carbon atoms, phenyl, and the corresponding substituted alkyl and phenyl which are substituted with a member selected from the group consisting of alkoxy having 1–4 carbon atoms, halo, nitro, cyano, and mixtures of such substituents.

2. Method according to claim 1 wherein said carbamate is used in the form of a mixture with a dispersible carrier vehicle, with said carbamate being present in an amount substantially between about 0.0005 and 95% by weight of the mixture.

3. Method according to claim 1 wherein said carbamate is applied to agricultural soil.

4. Method according to claim 1 wherein said carbamate is 1-(1 - fluoroacetamido-2,2,2-trichloro)ethyl-N-($C_1$–$C_4$ alkyl)-carbamate having the formula

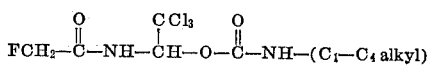

5. Method according to claim 1 wherein said carbamate is 1-(1 - fluoroacetamido-2,2,2-trichloro)ethyl-N,N-di($C_1$–$C_4$ alkyl)-carbamate having the formula

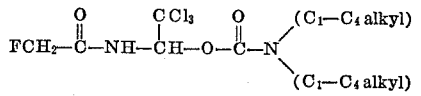

6. Method according to claim 1 wherein said carbamate is 1-(1 - fluoroacetamido-2,2,2-trichloro)ethyl-N-phenyl carbamate having the formula

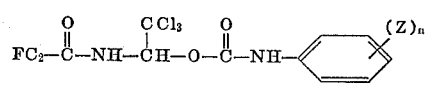

in which Z is selected from the group consisting of alkoxy having 1–4 carbon atoms, chloro, and nitro, and $n$ is a number from 0 to 2.

7. Method according to claim 1 wherein said carbamate is 1-(1 - fluoroacetamido-2,2,2-trichloro)ethyl-N,N-dimethyl carbamate having the formula

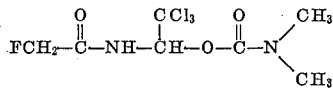

8. Method according to claim 1 wherein said carbamate is 1-(1 - fluoroacetamido-2,2,2-trichloro)ethyl-N-methyl carbamate having the formula

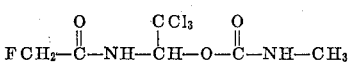

9. Method according to claim 1 wherein said carbamate is 1-(1 - fluoroacetamido-2,2,2-trichloro)ethyl-N-(4'-nitrophenyl)-carbamate having the formula

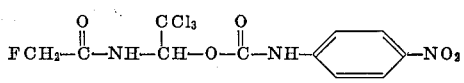

10. Method according to claim 1 wherein said carbamate is 1-(1 - fluoroacetamido-2,2,2-trichloro)ethyl-N-phenyl-carbamate having the formula

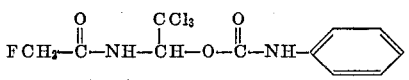

11. Method according to claim 1 wherein said carbamate is 1-(1 - fluoroacetamido-2,2,2-trichloro)ethyl-N-(4'-ethoxy-phenyl)-carbamate having the formula

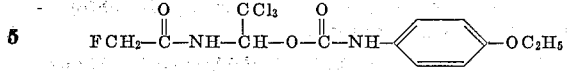

12. Method according to claim 1 wherein said carbamate is 1-(1-fluoroacetamido-2,2,2-trichloro)ethyl-N-(3',4'-dichlorophenyl)-carbamate having the formula

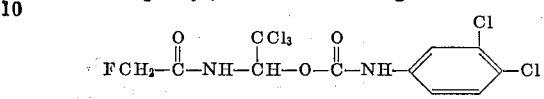

References Cited

UNITED STATES PATENTS

| | | | |
|---|---|---|---|
| 2,273,849 | 2/1942 | Epstein et al. | 167—22 |
| 2,469,340 | 5/1949 | Payne | 167—22 |
| 3,211,770 | 10/1965 | Pyne | 167—22 |
| 3,234,248 | 2/1966 | Scherer et al. | 167—22 |
| 3,253,030 | 5/1966 | Buc | 167—22 |

OTHER REFERENCES

Pianka et al., "N-Substituted methylamides," (1965) Brit. 993,051, May 26, 1965, CA 63, p. 9822 (1965).

LEWIS GOTTS, Primary Examiner

G. HOLLRAH, Assistant Examiner

U.S. Cl. X.R.

71—106, 111; 260—465, 465.4, 472, 482

PO-1050
(5/69)

UNITED STATES PATENT OFFICE
CERTIFICATE OF CORRECTION

Patent No. 3,476,490      Dated Nov. 4, 1969

Inventor(s) CHRISTA FEST and INGEBORG HAMMANN

It is certified that error appears in the above-identified patent and that said Letters Patent are hereby corrected as shown below:

Column 3, line 1 (specification, page 4, line 11) "hesperdium" should be --hesperidum--; column 4, line 19 (specification, page 7, line 14) "0.1" should be --0.01--; column 4, line 36 (specification, page 8, line 2) "ids" should be --ods--; column 4, line 42 (specification, page 8 line 7) "arthropodically" should be --arthropodicidally--; column 5, Table 1 (specification, page 9, line 15) under the heading "Concentration of Active Compound in percent" "0 2" the first figure in the vertical column should be --0.2--; column 6, Table 2 (specification, page 11, lines 5-6) under the heading "Degree of Destruction in percent after 8 days" for the first vertical entry insert the figure --0-- ;

SIGNED AND
SEALED

JUN 3 0 1970

(SEAL)
Attest:

Edward M. Fletcher, Jr.
Attesting Officer

WILLIAM E. SCHUYLER, JR.
Commissioner of Patents